United States Patent [19]

Chang

[11] Patent Number: 5,785,403
[45] Date of Patent: Jul. 28, 1998

[54] PORTABLE AUDIO-VISUAL APPARATUS OF WIRELESS MICROPHONE COMBINED WITH LASER INDICATOR

[76] Inventor: Sheng-Hsiung Chang, C/O Hung Hsing Patent Service Center P.O. Box 55-1670, Taipei, Taiwan

[21] Appl. No.: 782,276

[22] Filed: Jan. 13, 1997

[51] Int. Cl.$^6$ ............................................. G03B 21/14
[52] U.S. Cl. ............................................. 353/42; 353/15
[58] Field of Search .............................. 353/42, 122, 15; 359/142, 143, 145, 146, 148

[56] References Cited

U.S. PATENT DOCUMENTS

| | | | |
|---|---|---|---|
| 4,291,954 | 9/1981 | Wilson | 353/42 |
| 4,306,782 | 12/1981 | Sobotta | 353/42 |
| 5,408,284 | 4/1995 | Berger et al. | 353/122 |
| 5,718,496 | 2/1998 | Feldman et al. | 353/42 |

*Primary Examiner*—William Dowling

[57] ABSTRACT

A portable audio-visual apparatus includes: a casing having a tilting surface formed on an upper portion of the casing adjacent to a jack for inserting a right-angle plug of a microphone having a cable connectable between the microphone and the plug for outwardly transmitting radio-frequency sound waves to be received by a receiver and amplifier, with at least a volume switch provided on the casing for a direct convenient volume adjustment on the casing of the wireless microphone; and a laser point indicator secured in the casing opposite to the jack of the casing for emitting a laser light point for an optical point indication on a screen as displayed by a projector, whereby upon winding the cable of the microphone when not in use, the cable adjacent to the microphone will be smoothly rested on the tilting surface of the casing without bending, twisting, breaking and damaging the cable and the microphone.

7 Claims, 5 Drawing Sheets

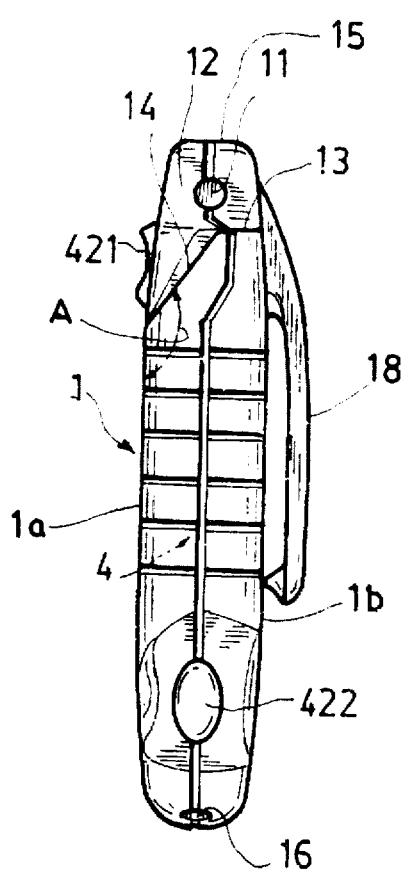

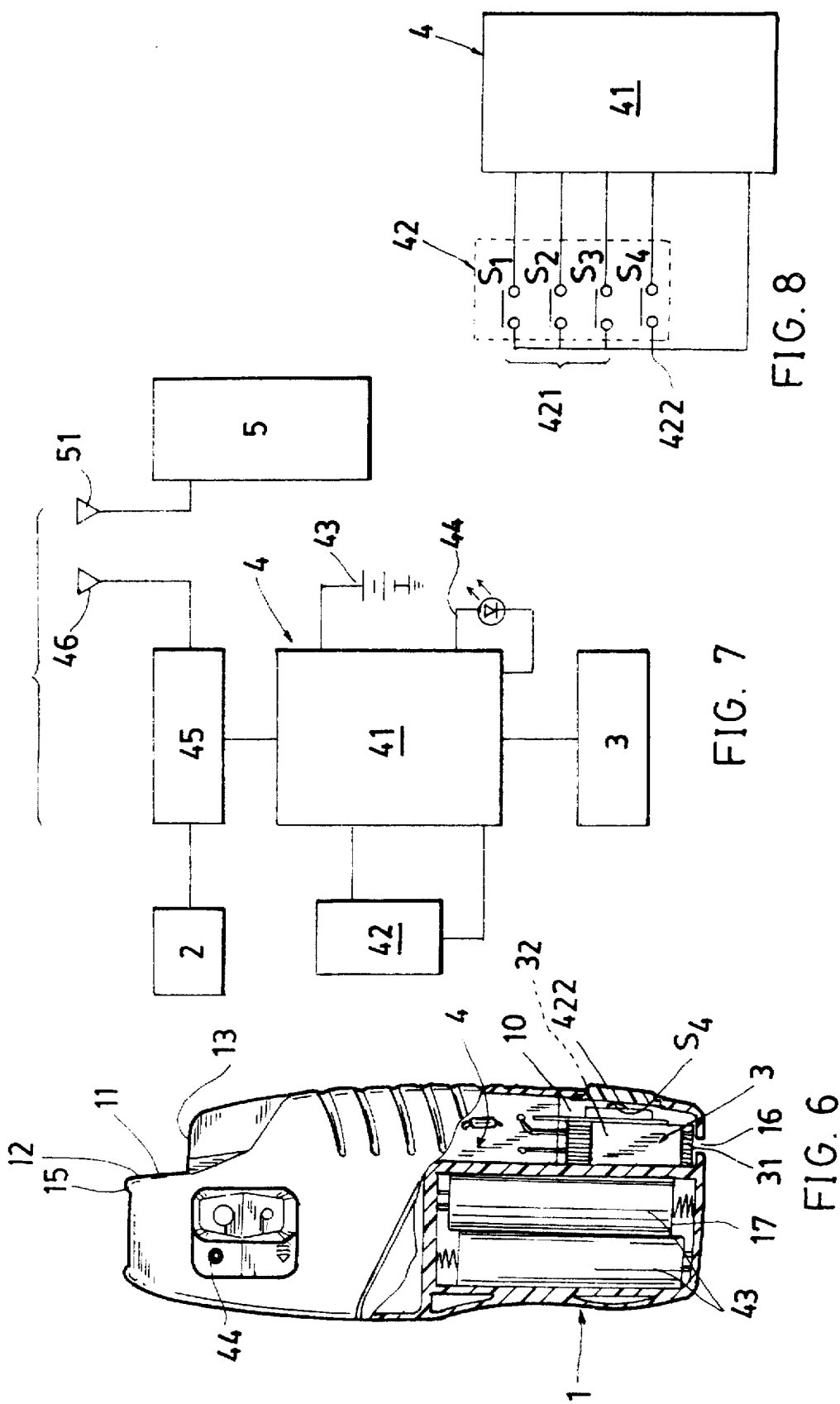

PORTABLE AUDIO-VISUAL APPARATUS OF WIRELESS MICROPHONE COMBINED WITH LASER INDICATOR

BACKGROUND OF THE INVENTION

For paging or loudspeaking purpose, a conventional amplifier is shown in FIG. 1 including: a wireless microphone set W having a miniature microphone M connected to the microphone set W by a cable C and a plug P inserted into a casing of the microphone set W for transmitting radio-frequency (RF) sound waves outwardly through the air; and a receiver R for receiving the RF waves from the wireless microphone set W for amplifying the sound output from the receiver R in which at least a knob K is provided for adjusting the volume of the output sound.

However, when a speaker gives a speech through the microphone M carried on the speaker's body trying to adjust his sound level, he must come to the receiver R for adjusting the volume of the sound. Whenever the speaker approaches the receiver R, a feed-back effect may cause noise through the amplifier. Also, to adjust the sound volume is done on the receiver R, rather than the microphone set w, thereby causing inconvenience for the speaker.

When it is not in use, the cable C of the microphone M shall be wound on the casing of the microphone set W to easily break the cable since the cable C is generally perpendicular to the plug P inserted in the casing and upon winding of the cable C on the casing, the cable portion just adjacent to the plug P will be easily bent, twisted and greatly stressed, thereby causing breakage of the cable C and damaging the effect of the microphone.

Meanwhile, if the speaker needs to use a laser point indicator (not shown) in order to help show a description or a diagram on a screen as displayed by an overhead projector, he must prepare the laser point indicator or a laser pen in addition to his wireless microphone, causing operation confusion or inconvenience when a sound volume adjustment of the microphone and a laser light indication are simultaneously required. Moreover, to purchase and prepare both instruments including the wireless microphone and the laser point indicator is uneconomic and redundant.

Therefore, the present inventor has found the drawbacks of the conventional portable amplifier and invented the present audio-visual apparatus for improving the drawbacks of the conventional instruments.

SUMMARY OF THE INVENTION

The object of the present invention is to provide a portable audio-visual apparatus including: a casing having a tilting surface formed on an upper portion of the casing adjacent to a jack for inserting a right-angle plug of a microphone having a cable connectable between the microphone and the plug for outwardly transmitting radio-frequency sound waves to be received by a receiver and amplifier, with at least a volume switch provided on the casing for a direct convenient volume adjustment on the casing of the wireless microphone; and a laser point indicator secured in the casing opposite to the jack of the casing for emitting a laser light point for an optical point indication on a screen as displayed by a projector, whereby upon winding the cable of the microphone when not in use, the cable adjacent to the microphone will be smoothly rested on the tilting surface of the casing without bending, twisting, breaking and damaging the cable and the microphone.

BRIEF DESCRIPTION OF THE DRAWINGS

FIG. 2 is a front view illustration of the present invention.

FIG. 3 is a right side view of FIG. 2 when removing the microphone.

FIG. 6 is a partial cut-away illustration of the present invention.

FIG. 7 is a block diagram of a trasmitting control means of the present invention.

FIG. 8 shows a switch means of the transmitting control means of this invention.

DETAILED DESCRIPTION

Figure 9:
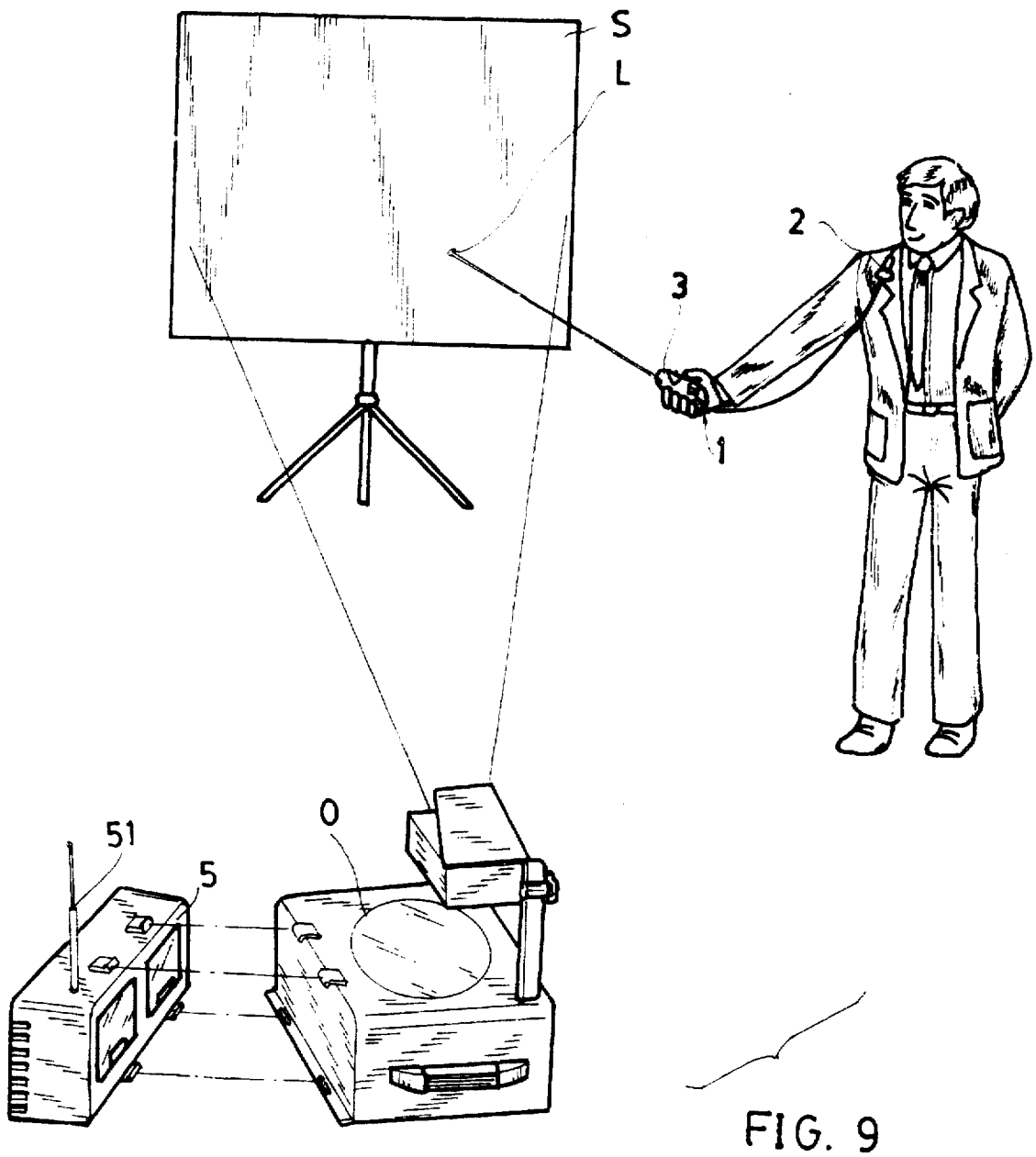
FIG. 9 is an illustration showing the use of the present invention by a speaker such as for a briefing purpose.

As shown in FIGS. 2–9, a preferred embodiment of the portable audio-visual apparatus of wireless microphone combined with laser indicator of the present invention comprises: a casing 1 carried by or fastened to a user, a microphone 2 connectable with the casing 1, a laser indicator 3 secured in the casing 1, and a transmitting control means 4 mounted in the casing 1 for controlling a modulation of radio-frequency (RF) sound waves and for transmitting the RF waves outwardly through the air to be received by a receiving amplifier 5, and for controlling and driving a laser light L as emitted from the laser indicator to be displayed on a screen S when an image is displayed on the screen S as emitted by an overhead (or slide) projector O as shown in FIG. 9. The receiving amplifier 5 includes: a receiving antenna 51 for receiving the radio-frequency (RF) sound waves as emitted from a transmitting antenna 46 on the audio-visual apparatus of the present invention for loud speaking purpose by amplifying the sound signals as received in the amplifier 5.

The casing 1 includes: a jack 11 for connecting a plug 22 of the microphone 2 formed on a vertical side wall 12 on a first (or upper) portion of the casing 1 having a longitudinal axis 110 defined at a longitudinal center of the jack 11, a horizontal platform 13 horizontally intersecting a bottom of the vertical side wall 12 to define a plug space 10 between the vertical side wall 12 and the horizontal platform 13 for accommodating the plug 22 of the microphone 2 within the plug space 10, a tilting surface 14 for resting the plug 22 thereon inclined downwardly from the horizontal platform 13 towards a front panel 1a of the casing 1 to define an obtuse angle A between the horizontal platform 13 and the front panel 1a with the obtuse angle A approximating 180 degrees and preferably being 135 degrees and not limited in the present invention, a laser emitting aperture 16 formed in a second (or lower) portion of the casing opposite to the jack 11 for emitting laser light L as emitted from the laser indicator 3. The obtuse angle A between the tilting surface 14 and the front panel 1a will prevent bending, twisting and breakage of the cable 21 adjacent to the plug 22.

A clip 18 is formed on a rear panel 1b of the casing 1 for fastening the casing 1 on a user's body or clothing.

Figure 1:
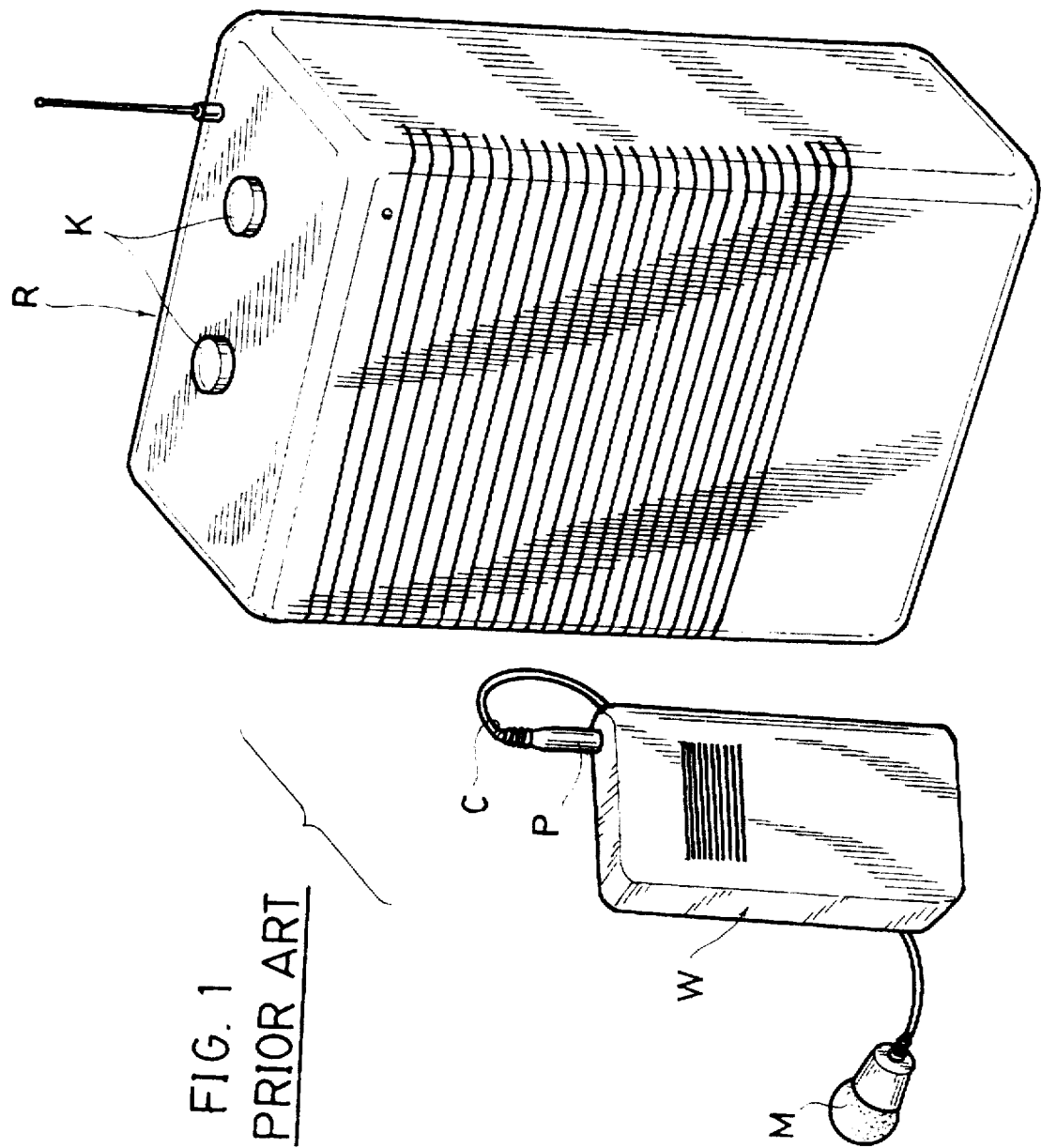
FIG. 1 shows a conventional portable amplifier with wireless microphone.
Figure 4:
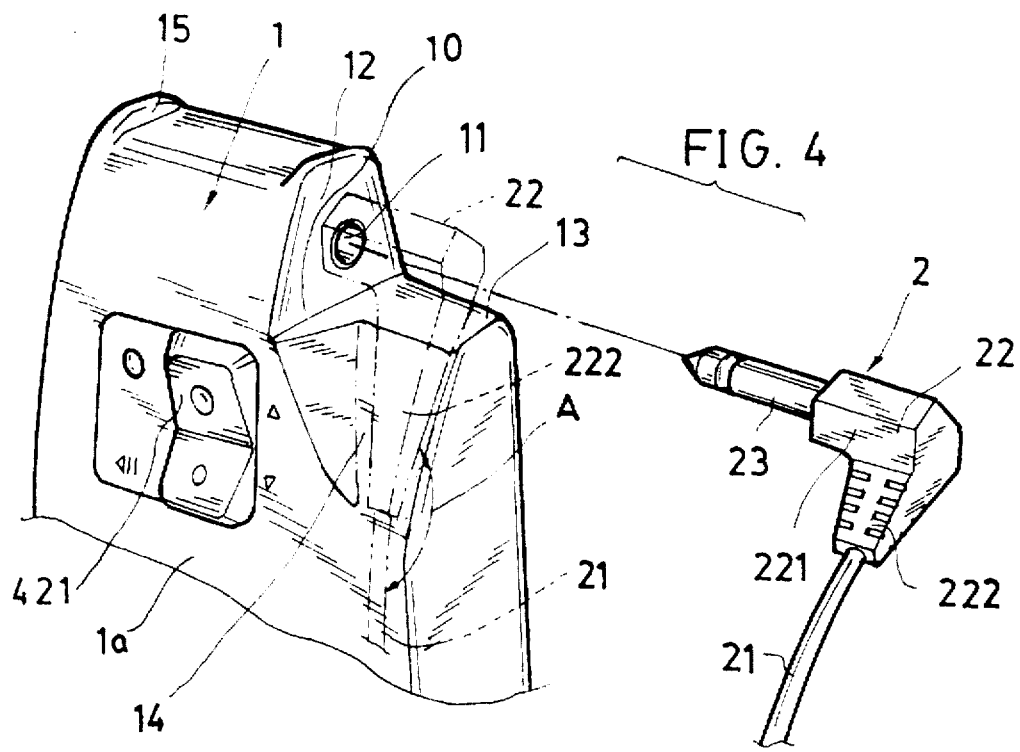
FIG. 4 is an illustration showing an insertion of the microphone plug into the jack formed in the casing.
Figure 5:
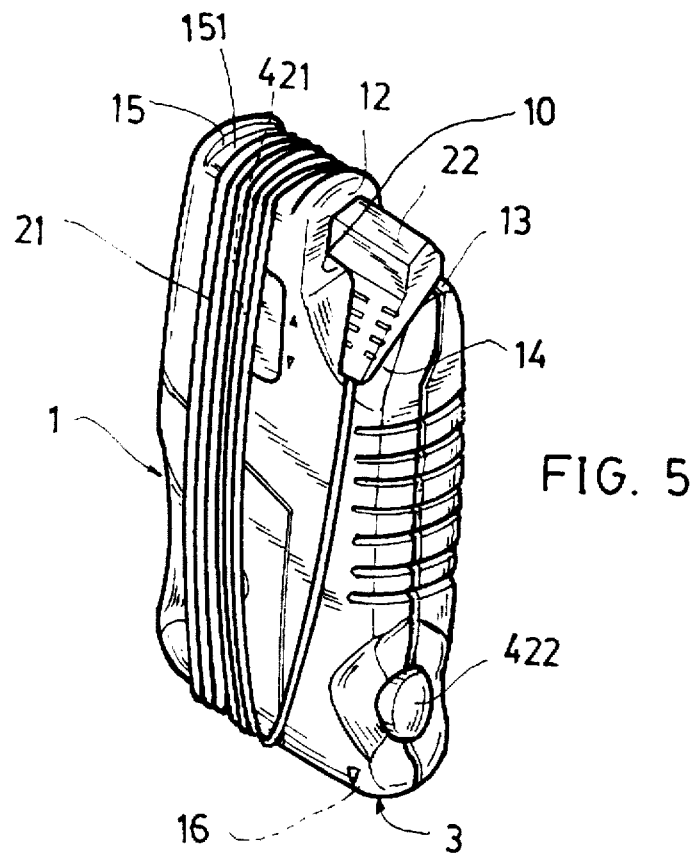
FIG. 5 is a perspective view of the present invention when winding the microphone cable on the casing.

The microphone 2 includes a right-angle plug 22 having a plug pin 23 insertable into the jack 11 of the casing 1 and a cable 21 connected between the plug 22 and the microphone 2, with the cable 21 wound on the casing 1 and confined in a recess 151 between two top extensions 15 formed on a top portion of the casing 1 as shown in FIG. 5 when rotating the plug 22 downwardly around the longitudinal axis 110 from FIG. 2 to FIG. 5 to rest the plug 22 on the tilting surface 14 and winding the cable 21 on the casing 1.

The right-angle plug 22 of the microphone 2 includes: a pin connecting arm 221 connected with the plug pin 23, and a cable connecting arm 222 connected with the cable 21 as shown in FIG. 4 and separating from the pin connecting arm 221 with a right angle to allow the cable 21 to be linearly aligned with the cable connecting arm 222 to prevent from bending, twisting and breakage of the cable 21.

The plug space 10 and the tilting surface 14 may also be formed on a left side portion of the casing as modified and not limited in this invention.

The laser indicator 3 includes: a lens 31 for concentrating a laser light (point or beam) to be displayed on a screen (FIG. 9) or a wall (not shown), and a laser illuminator 32, which may be a laser diode (but not limited), electrically connected to the transmitting control means 4 for driving and controlling an emission of the laser light L projected outwardly through the lens 31 and through a laser emitting aperture 16 formed in the casing 1.

The transmitting control means 4 as shown in FIGS. 7, 8 includes: an electronic controller 41 which may be a microprocessor controller or other electronic controllers mounted in the casing 1 for controlling modulation of a modulator 45 electrically connected with the electronic controller 41 for transmitting radio-frequency (RF) sound waves in the air through a transmitting antenna 46 connected to the modulator 45 which is connected to the microphone 2 for inputing sound signals from the microphone 2 into the modulator 45, and for controlling a driving of the laser indicator 3 electrically connected to the electronic controller 41 for emitting laser light outwardly for an optical indication; a power source 43 including at least a battery stored in a battery chamber 17 formed in the casing 1 for powering the electronic controller 41 having a power indicator 44 which may be a light emitting diode (LED) or a bulb for indicating a power-on of the control means 4 of the present invention; and a switch means 42 including at least an audio switch 421 for switching on or off of the power source to the microphone 2 and for adjusting a sound volume of soundwaves as received by the receiving amplifier 5 and output from the modulator 45 connected to the electronic controller 41, and a visual switch 422 for switching on or off a laser power switch S4 (or for selecting several colorful laser lights) for controlling the lase light as emitted from the laser indicator 3 connected with the electronic controller 41.

The electronic circuit of the control means 4 may be formed as a printed circuit board (PCB) mounted in the casing 1. The shapes of the casing 1, the arrangement or locations of the elements of this invention and the switch means 42 may be further modified, besides the embodiments as illustrated in the specification and drawings, not limited in the present invention.

The controller 41 may also be modified to vary the light emission of the laser illuminator 32 such as for forming a laser point or a laser beam; or for flashing; or to vary the optical colors of the laser light as emitted from the laser indicator 3; or for other laser-controlling purposes.

The audio switch 421 connected to the electronic controller 41 as shown in FIGS. 8, 2 includes: a sound-increasing switch S1 for increasing the sound volume of the sound waves as transmitted from the transmitting antenna 46 of the transmitting control means 4 and received by the receiving amplifier 5 having a receiving antenna 51 for receiving the sound waves transmitted from the transmitting antenna 46, a sound-decreasing switch S2 for decreasing the sound volume of the sound waves, and an on-off switch S3 for switching on or off the power to the microphone 2.

As shown in FIG. 2, the audio switch 421 may be slid leftwardly (P1) to switch off the on-off switch S3 (not shown) to switch off the power and also the power indicator 44 which may also be shielded by the slidadble switch 421. Then, the cable 21 of the microphone 2 may be wound on the casing 1 as shown in FIG. 5.

Upon depression of the visual switch 422 to actuate the laser on-off switch S4, the laser illuminator 32 will be energized to emit laser light to be emitted through lens 31, the aperture 16 in the casing 1 to have a laser light point L (or a beam) indicated on the screen S as shown in FIG. 9. If the speaker intends to adjust his sound volume, he merely adjusts the audio switch 421 on the casing 1, without approaching the receiving amplifier 5, for a convenient volume adjustment and for preventing noise as caused by feed-back effect when the microphone 2 is too close to the amplifier 5. (Note: The receiver 5 may be detachably securable to the overhead projector O as shown in FIG. 9).

For winding the cable 21 of the microphone 2 on the casing 1, the right-angle plug 22 will be rested on the tilting surface 14 of the casing 1 to prevent an acute bending of the cable, thereby preventing deformation, twisting, breakage and damage of the cable and the microphone. So, this invention is superior to any conventional wireless microphone and amplifier. Meanwhile, just by preparing one set of the audio-visual apparatus of the present invention, there is no need to further prepare a laser pen (laser light indicator) when an overhead projector O is provided for a briefing purpose, thereby saving money and enhancing convenience for the user (speaker). The power source (battery) may provide power both for the laser indicator 3 and the microphone 2 for a compact, light weight and convenient handling of the audio-visual apparatus.

The present invention may be modified without departing from the spirit and scope of the present invention. The casing 1 may also be provided a display window for showing some data of the wireless microphone of the present invention.

I claim:

1. A portable audio-visual apparatus for transmitting radio-frequency sound waves from a wireless microphone to be received and amplified by a receiving amplifier comprising:

a casing having a jack formed on a first portion of said casing for connecting a microphone into said jack, and having means formed on said casing for smoothly winding a cable of the microphone on said casing without bending, twisting and breaking said cable on said casing;

a laser indicator mounted in said casing for emitting a laser light outwardly from said casing; and a transmitting control means electrically connected with said microphone and said laser indicator for controlling an output of said microphone and said laser indicator through a switch means formed on said casing.

2. A portable audio-visual apparatus according to claim 1, wherein said casing includes: said jack for connecting a plug of the microphone formed on a vertical side wall on a first portion of the casing having a longitudinal axis defined at a longitudinal center of the jack, a horizontal platform horizontally intersecting a bottom of the vertical side wall to define a plug space between the vertical side wall and the horizontal platform for accommodating the plug of the microphone within the plug space, a tilting surface for resting the plug thereon inclined downwardly from the horizontal platform towards a front panel of the casing to define an obtuse angle between the horizontal platform and the front panel with the obtuse angle approximating 180 degrees, a laser emitting aperture formed in a second portion of the casing for emitting a laser light as emitted from the laser indicator.

3. A portable audio-visual apparatus according to claim 2, wherein said microphone includes a right-angle plug having a plug pin insertable into the jack of the casing and a cable connected between the plug and the microphone, with the cable wound on the casing and confined in a recess between at least two extensions formed on the casing, whereby when rotating the plug downwardly around the longitudinal axis to rest the plug on the tilting surface, the cable will be smoothly wound on the casing.

4. A portable audio-visual apparatus according to claim 3, wherein said right-angle plug of the microphone includes: a pin connecting arm connected with the plug pin, and a cable connecting arm connected with the cable and separating from the pin connecting arm with a right angle to allow the cable to be linearly aligned with the cable connecting arm to prevent from bending, twisting and breakage of the cable.

5. A portable audio-visual apparatus according to claim 1, wherein said laser indicator includes: a lens for concentrating a laser light to be displayed on a screen, and a laser illuminator, electrically connected to the transmitting control means for driving and controlling an emission of the laser light projected outwardly through the lens and through a laser emitting aperture formed in the casing.

6. A portable audio-visual apparatus according to claim 1, wherein said transmitting control means includes: an electronic controller mounted in the casing for controlling a modulation of a modulator electrically connected with the electronic controller for transmitting radio-frequency (RF) sound waves in the air through a transmitting antenna connected to the modulator which is connected to the microphone for inputing sound signals from the microphone into the modulator, and for controlling a driving of the laser indicator electrically connected to the electronic controller for emitting laser light outwardly for an optical indication; a power source including at least a battery stored in a battery chamber formed in the casing for powering the electronic controller having a power indicator for indicating a power-on of the control means; and a switch means including at least an audio switch for switching on or off of the power source to the microphone and for adjusting a sound volume of soundwaves as received by the receiving amplifier as output from the modulator connected to the electronic controller, and a visual switch for switching on or off the laser light as emitted from the laser indicator connected with the electronic controller.

7. A portable audio-visual apparatus according to claim 6, wherein said audio switch connected to the electronic controller includes: a sound-increasing switch for increasing the sound volume of the sound waves as transmitted from the transmitting antenna of the transmitting control means and received by the receiving amplifier having a receiving antenna for receiving the sound waves transmitted from the transmitting antenna, a sound-decreasing switch for decreasing the sound volume of the sound waves, and an on-off switch for switching on or off the power to the microphone.

* * * * *